(No Model.)

G. F. BUTTERFIELD.
FABRIC FOR SHOE SOLES AND OTHER PURPOSES.

No. 325,785. Patented Sept. 8, 1885.

WITNESSES:

INVENTOR:

UNITED STATES PATENT OFFICE.

GEORGE F. BUTTERFIELD, OF STONEHAM, MASSACHUSETTS.

FABRIC FOR SHOE-SOLES AND OTHER PURPOSES.

SPECIFICATION forming part of Letters Patent No. 325,785, dated September 8, 1885.

Application filed December 6, 1884. (No specimens.)

*To all whom it may concern:*

Be it known that I, GEORGE F. BUTTERFIELD, a citizen of the United States, residing at Stoneham, in the county of Middlesex and State of Massachusetts, have invented certain new and useful Improvements in Material for Soling and other Purposes; and I do hereby declare that the same are fully described in the following specification, and illustrated in the accompanying drawings.

My invention is a new manufacture, consisting of a piece, sheet, or roll of felt or equivalent light and yielding material coated on both sides with vulcanized rubber compound, one of said coatings being by preference much thicker than the other, so that the material is suitable for soles or other purposes requiring special capacity to resist wear on the exposed side, with elasticity in the whole. In some instances I perforate the felt sheet at intervals before applying the rubber, so that the latter may enter from each side and unite through such perforations to bind the whole together.

Figure 1:
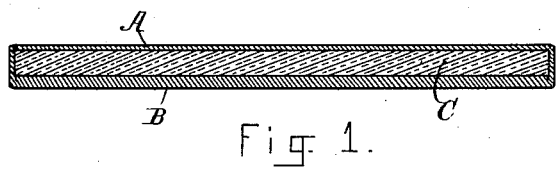
Figure 2:
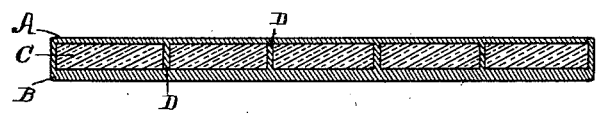

The drawings show in section two forms of my improved material, Figure 1 being plain, and Fig. 2 perforated in the fibrous body, with rubber filling the perforations.

A and B are respectively the upper and lower coatings of rubber applied to the loose fibrous body C in the raw or unvulcanized state and cured or vulcanized thereon. The body C is preferably of felt, which is light, cheap, and yielding, and can be readily obtained of the desired thickness for my purposes. It is, moreover, a good non conductor of heat and cold. I sometimes substitute other materials of like character in place of the felt—such as vegetable fiber, wood fiber, sheeted hair, and the like.

The thickness of the coatings A and B will depend largely on the purpose to which the material is to be applied; but for most uses a thin skin, barely sufficient to make it waterproof, will suffice for the upper side, while the side B, which is exposed to wear, may have a thickness equal to that of the body C, or even greater.

When the body C is thoroughly felted together so as to have no tendency to split into two sheets, the surface-coatings shown in Fig. 1 will be sufficient; but in order to clinch the rubber through the body I sometimes perforate the part C, at intervals of an inch or so, and permit the rubber, when applied and under the pressure of vulcanizing, to penetrate through such openings, as at D, and unite the two layers at such points to bind the three sheets into one fabric.

This material is adapted for a variety of purposes, among others for soles and heels of boots and shoes. When designed for this purpose, suitably-shaped pieces may be cut out by dies from the sheet before vulcanization, and the rubber subsequently cured in suitable molds. The edges of the soles or heels will be covered with rubber, either by placing around the piece itself or around the edges of the recess in the mold a strip of rubber compound to unite with that on the surfaces; or where marginal space is left in the mold the rubber will fill it, and cover the edges of the soles or heels simply by its expansion in the process of vulcanization.

I am aware that cotton duck and other thin woven goods have been coated with rubber on both sides to produce practically non-elastic articles—such as belting; and also that felt boots and shoes have been coated outwardly with rubber. These I disclaim; but

I claim as my invention—

1. The new material herein described, consisting of the thick yielding felted or equivalent body C, having the water-proof coatings A and B secured thereon, substantially as set forth.

2. The improved material herein described, consisting of the perforated yielding body C and the two rubber surfaces A and B, united through such perforations, as at D, substantially as set forth.

In testimony whereof I hereto affix my signature in presence of two witnesses.

GEORGE F. BUTTERFIELD.

Witnesses:
A. H. SPENCER,
C. G. KEYES.